Oct. 28, 1952 L. J. WINCHELL 2,615,292
MOVING ATTACHMENT FOR POWER MACHINERY
Filed Sept. 30, 1947 4 Sheets-Sheet 1

*Inventor*
Laurence J. Winchell

By *Clarence A. O'Brien and Harvey B. Jackson*
*Attorneys*

Oct. 28, 1952   L. J. WINCHELL   2,615,292
MOVING ATTACHMENT FOR POWER MACHINERY
Filed Sept. 30, 1947   4 Sheets-Sheet 2
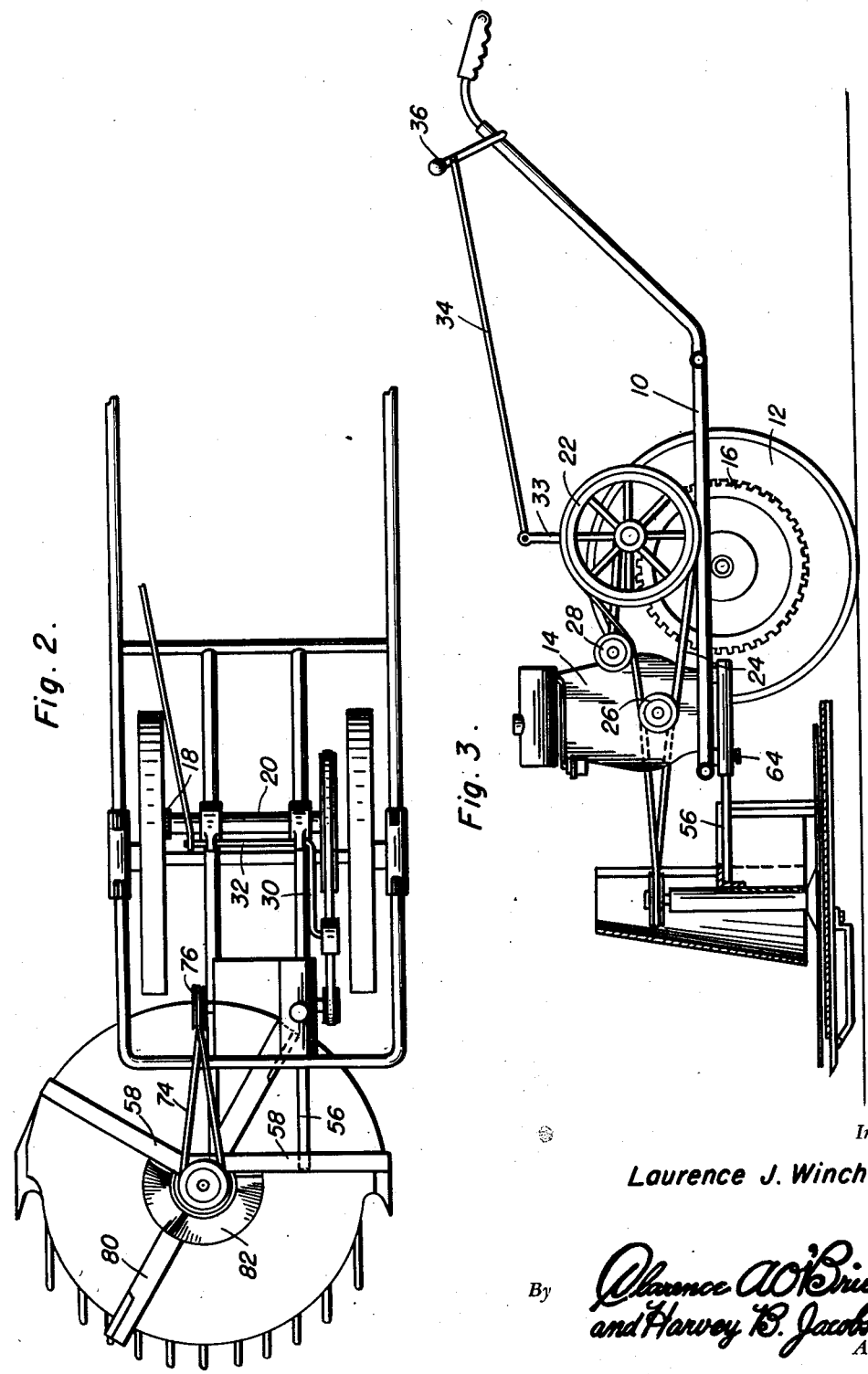
Inventor
Laurence J. Winchell Oct. 28, 1952 — L. J. WINCHELL — 2,615,292
MOVING ATTACHMENT FOR POWER MACHINERY
Filed Sept. 30, 1947 — 4 Sheets-Sheet 3
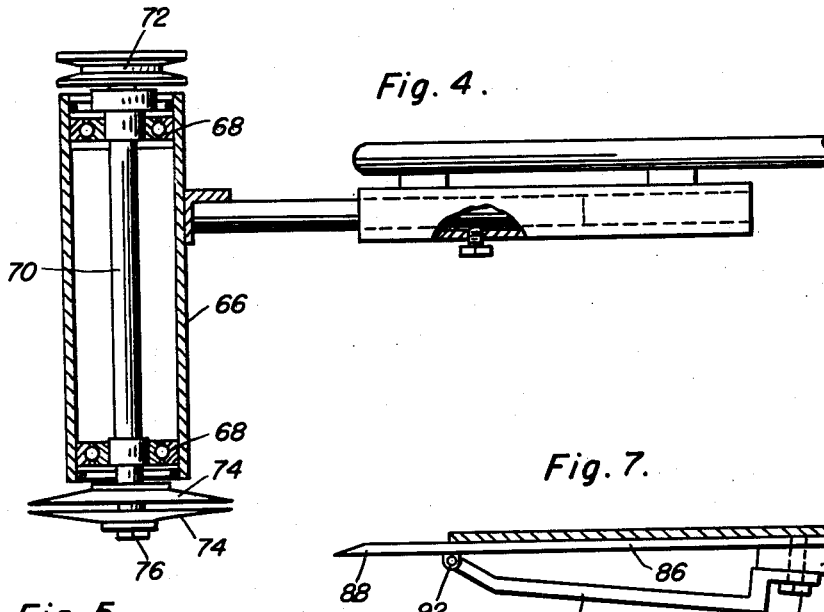
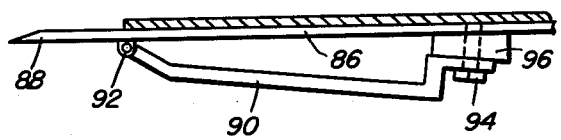
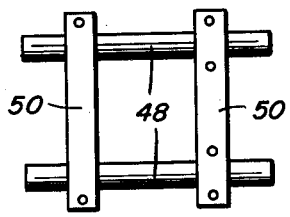
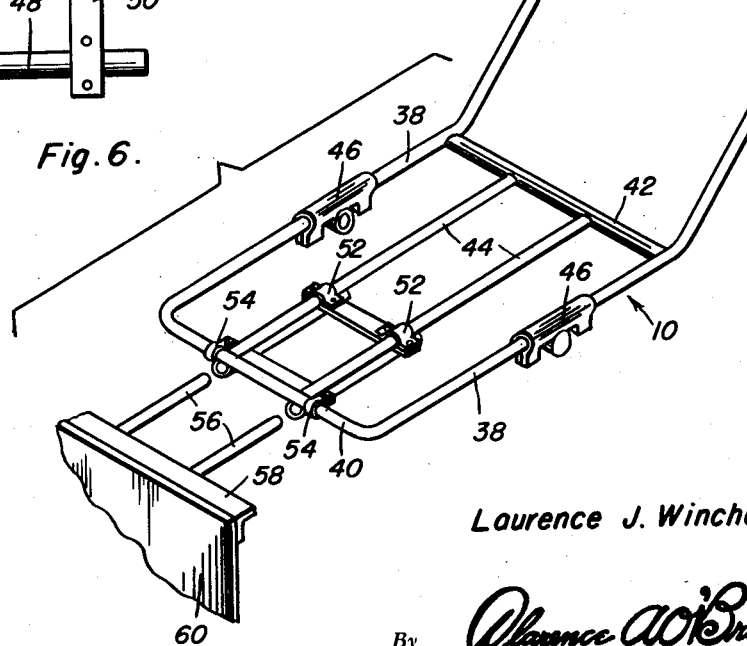
Inventor
Laurence J. Winchell Oct. 28, 1952 — L. J. WINCHELL — 2,615,292
MOVING ATTACHMENT FOR POWER MACHINERY
Filed Sept. 30, 1947 — 4 Sheets-Sheet 4

Inventor
Laurence J. Winchell

By Clarence A. O'Brien
and Harvey B. Jacobson
Attorneys

Patented Oct. 28, 1952

2,615,292

UNITED STATES PATENT OFFICE 2,615,292

MOWING ATTACHMENT FOR POWER MACHINERY

Laurence J. Winchell, Fort Scott, Kans.

Application September 30, 1947, Serial No. 776,915

2 Claims. (Cl. 56—25.4)

This invention comprises novel and useful improvements in a mowing attachment for power machinery and more specifically pertains to a mowing attachment which may be readily applied to tractors or other farm machinery for incorporating therewith the advantages of a horizontally rotating cutter bar but obviating the disadvantages commonly associated with such mowing devices.

The principal feature of this invention resides in providing a cutter guard or shield arrangement which will prevent the commonly known pulverizing or cutting of grass at a plurality of points by the rapidly revolving horizontal cutter blade. The invention is further featured by novel and improved means for mounting this guarding attachment or shield, and which may be readily applied or removed as desired.

These, together with additional objects and features of the invention which will later become apparent as the following description proceeds, are attained by this device, preferred embodiments of which have been illustrated, by way of example only in the accompanying drawings, wherein:

Figure 2 is a top plan view of the arrangement shown in Figure 1;

Figure 3 is a side elevational view of Figures 1 and 2;

Figure 4 is an enlarged fragmentary detailed view, parts being shown in elevation and parts in vertical section, of a portion of the attachment;

Figure 5 is a top plan view of a part of the invention;

Figure 6 is a group perspective view indicating a part of the agricultural implement frame and showing the manner of attaching the device thereto;

Figure 7 is an enlarged detailed view partly in section of a portion of the cutter guard attachment of the invention;

Figure 1:
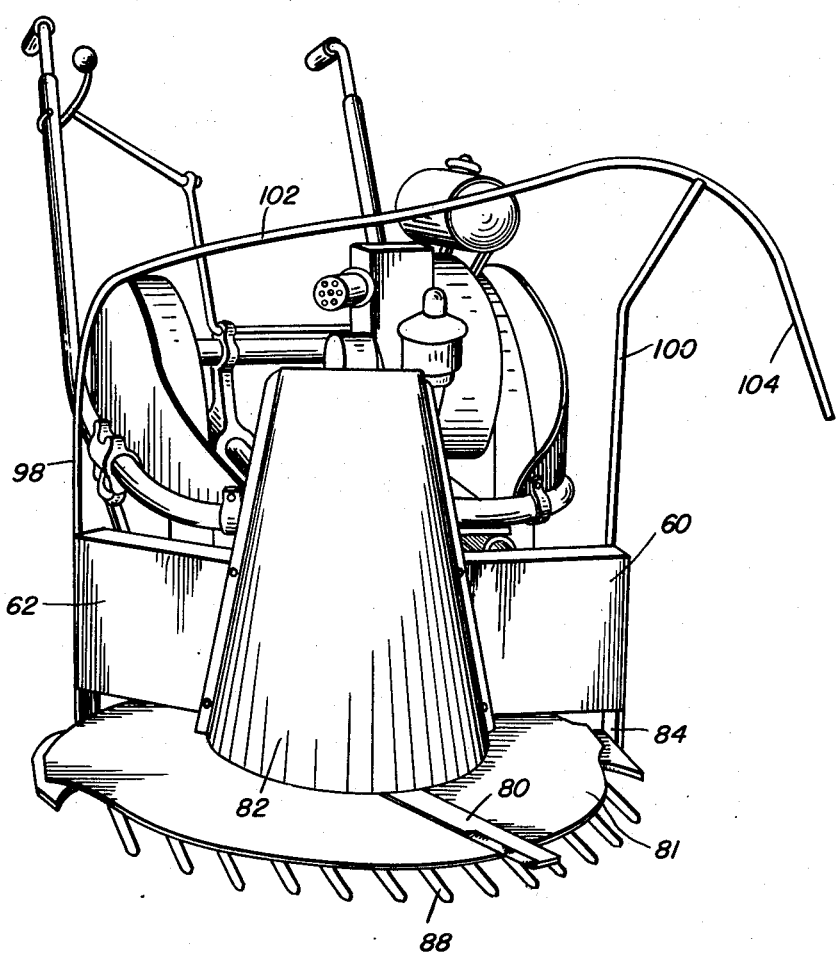
Figure 1 is a perspective view illustrating the attachment applied to a conventional type of agricultural cultivating power implement.

Referring now more specifically to the embodiment of Figures 1–7 of the accompanying drawings, wherein like numerals designate similar parts throughout the various views, there is disclosed a conventional type of power operated agricultural implement having a supporting frame 10 mounted upon traction wheels 12 and provided with power operated means such as an internal combustion engine 14. This type of power operated implement has one of its driving wheels provided with a driving gear 16 operated by a pinion 18 carried by a lay shaft 20 suitably journalled upon the frame and operated by means of a pulley 22 and belt 24 from a driving pulley 26 on the crank shaft of the engine. The application of power to the driving belt 24 is controlled by a tensioning pulley 28 journalled upon the end of an arm 30 carried by a lay shaft 32 suitably journalled upon the frame and provided with an operating arm 33 connected by a link 34 with a manually operable control lever 36. The idler pulley thus constitutes the equivalent of a clutch in controlling the application of power from the engine 14 to the traction wheels of the implement, it being understood that both of the traction wheels are rigidly fixed to the same axle, whereby the drive is imparted equally to both traction wheels.

It is to be understood that customarily this agricultural implement is provided with suitable tools secured to the frame 10 for cultivating the ground, but these tools may be removed and the attachment comprising the subject matter of this invention substituted when it is desired to convert the device into a power operated mower.

At this point, attention is directed to Figure 6 for a better understanding of the construction of the frame 10, whereby the manner of mounting the device thereon will be more readily understood. The frame member 10 is shown as consisting of tubular side members 38 having transverse end members including an integral front member 40 and a rigidly attached rear member 42, together with longitudinally extending reinforcing tubular members 44 secured between and to the end members. Mounted upon the side members 38 are brackets 46 for journalling the axle of the device.

Referring now to Figure 5, there is shown the supporting frame of the attachment which consists of longitudinally extending tubular members 48 rigidly secured to transverse members 50, and positioned with the tubular members underlying the members 44 and the transverse members 50 extending transversely therebeneath.

As shown best in Figure 6, the supporting frame is clamped to the bars 44 by means of detachable clamps or clips 52 carried by the rearmost transverse member 50, while the forward member 50 is secured by similar clamps or clips 54 to the forward end bar 40. By this means, the supporting platform is positioned and secured beneath the frame 10 by means of the four clamps 52 and 54, the former preventing lateral displacement while the latter prevent longitudinal displacement of the device upon the frame. The tubular members 48 open forwardly of the frame of the implement, and are adapted to slidably and releasably receive lateral rod-like supporting arms 56 rigidly attached to an angle iron bracket 58 from which depend angularly disposed vertical plates 60 and 62 (see Fig. 1).

As shown in Figures 3 and 4, set screws 64 are provided in the tubular members 48 to lock and secure the support rods 56 in predetermined position therein.

Secured to the plates 60 and 62 adjacent their dihedral angle, is a vertically disposed cylindrical sleeve 66 in which is journalled as by bearings 68, a vertical shaft 70, having a driving pulley 72 at its upper end and clamping plates 74 retained as by an adjusting nut 76 at its lower end.

The pulley 72 is connected by a twisted belt 78 with a driving pulley 80 carried on the other end of the motor or internal combustion engine 14. This construction and arrangement is indicated in Figure 2. Detachably secured to the other end of the vertical shaft 70, between the members 74, is a cutter bar 80 having knife edges and which is rotatable in a horizontal plane by the power applied through the belt 78.

As will be noted by reference to Figure 2 in particular, the shaft 70 and its associated supporting structure are disposed to one side of the longitudinal center of the tractor frame 10 in order that the belt 78 may be in substantial vertical alignment with the driving pulley 76. As seen, the blade 80 is of such length as to cut a swath of greater width than that of the frame of the machine, the excess width lying to one side of the tractor frame.

Detachably secured to the angular front faces of the plates 60 and 62, and surrounding the casing 66, is a shielding member 82 which is shaped to form a portion of a frustum of a cone, as shown best in Figures 1 and 2. Extending from the outer ends of the plates 60 and 62 are depending arms 84 which support a guard or shield plate 86 in a position beneath and closely adjacent to the cutter bar 80. This guard shield comprises a generally annular member having at its front portion a plurality of forwardly extending teeth 88 which extend slightly beyond the ends of the cutter bar 80, and are closely positioned therebeneath.

As shown best in Figures 3 and 7, one or more skid members 90 are disposed beneath the shield 86, and are pivoted as at 92 to the front end of the shield and connected as by a fastening bolt 94 with a spacer washer 96 at the rear end thereof.

The purpose of the skids 90 are to enable the guard shield 86 to slide over the ground despite irregularities of terrain, as the implement and its mowing attachment are driven forward, to thereby prevent the blade digging into the ground.

In operation of this form of the invention, it will be noted that the shield 82 serves to fully protect the pulley 72, belt 74 and pulley 76 from contact by the material being cut, while the guard shield 86 with its teeth 88 serves to feed the grass evenly to the cutter bar and prevent possible contact of the latter with the ground.

To further assist in feeding tall grasses, hay or the like into the mower, there is provided as shown in Figure 1, a pair of upstanding members 98 and 100, which are secured adjacent the ends of the plates 60 and 62, in longitudinally as well as laterally spaced position relative to each other, and which are connected across their tops by a guide rail 102 terminating in a curved and forwardly extending arm 104. As the device moves forward, it will be evident that the standing grass or grain will be guided and bent by this guide rail member into proper position for cutting by the cutter bar.

From the foregoing, it will be seen that there has been provided a power moving attachment which may be readily applied to a power operated farm implement, and which may be readily removed therefrom as desired, yet which is thoroughly effective for cutting grass or grain, in a convenient and efficient manner with an improved cutting action and having an improved guard and guide shield.

Figure 8:
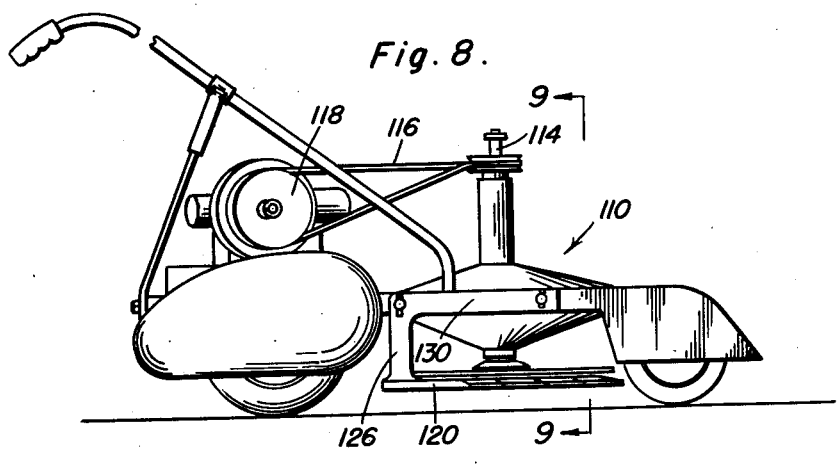
Figure 8 is a side elevational view of a modified form of guard attachment applicable to a mower having a horizontally rotating blade.
Figure 9:
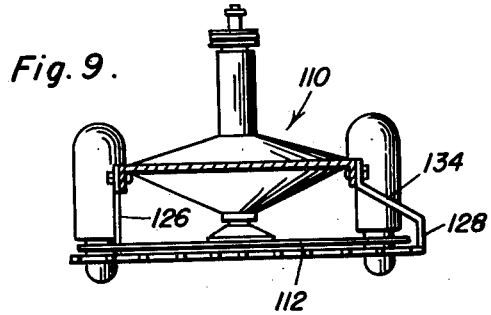
Figure 9 is a vertical transverse sectional detailed view taken substantially upon the plane of the section line 9—9 of Figure 8; and, Figure 10 is a perspective view of the guard attachment of Figures 8 and 9.
Figure 10:
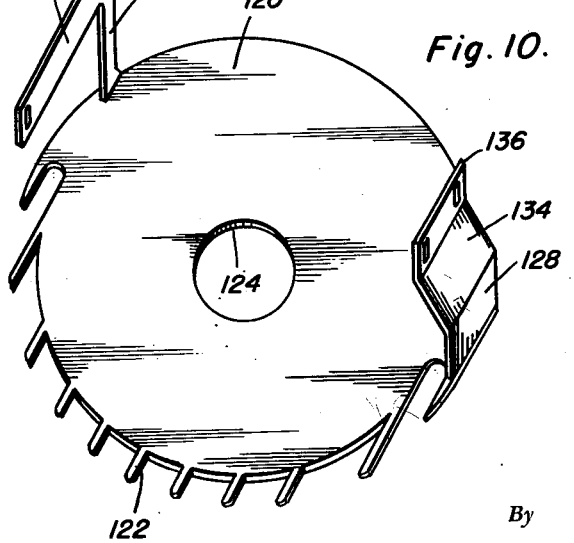

Attention is now directed to Figures 8–10 showing a modified form of the invention which may be applied to power mowers having a horizontally rotating cutter bar. In this form of the invention, there is disclosed generally at 110 any suitable type of power mower having the customary cutter bar 112 positioned therebeneath and operable by a vertically disposed driving shaft 114 through a belt 116 connected by pulleys with an internal combustion engine or other source of power as indicated generally at 118. In accordance with the principles of this invention, there is provided a guard attachment for positioning beneath said cutter bar to constitute a guard or shield therefor. This attachment, as shown best in Figure 10, comprises a generally circular plate 120 having forwardly projecting teeth 122 from its front end, an axial opening or aperture 124 in alignment with the axle of rotation of the cutter bar, for receiving or permitting access to the adjusting nut at the lower end of the cutter bar axle, together with integrally formed supporting brackets 126 and 128. The bracket 126 is provided with a forwardly extending arm 130 having vertically slotted openings as at 132, adapted for adjustable engagement upon the side of the frame of the tractor 110, while the arm 128 is provided with an angularly and inwardly disposed portion 134 whose terminal is vertically slotted as at 136 for detachable engagement with the other side of the frame. By this means, it will be seen that the guard shield may be readily secured to the frame of this type of tractor, and by adjustment of the fastening means extending through the slotted apertures 132 and 136, may be readily adjusted vertically of the frame in accordance with the customary vertical adjustments of the cutter bar.

The operation of this shield and attachment is similar to that of the preceding embodiment.

Since numerous modifications will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention what is claimed as new is:

1. A mowing attachment for power machinery comprising a support, means for mounting said support upon the frame of a power machine for adjustable, slidable movement, a housing on said support, a shaft supported entirely by said housing and journaled therein, a cutter blade on said shaft, means for rotating said shaft, a guard shield consisting of a flat plate extending beneath said blade and directly mounted upon said support, skid runners mounted upon the underside of said shield, said runners being pivoted to said shield for vertical pivoting movement, spacer blocks interposed between said runners and said shield.

2. The combination of claim 1 wherein said shield includes teeth extending forwardly from its front edge for guiding vegetation into the cutter blade.

LAURENCE J. WINCHELL.

REFERENCES CITED

The following references are of record in the file of this patent:

UNITED STATES PATENTS

| Number | Name | Date |
|---|---|---|
| 1,880,154 | Rotondo et al. | Sept. 27, 1932 |
| 1,940,216 | Jacobson | Dec. 19, 1933 |
| 2,225,139 | Urschel | Dec. 17, 1940 |
| 2,318,430 | Spahn | May 4, 1943 |
| 2,478,558 | Beranek et al. | Aug. 9, 1949 |